Jan. 6, 1925.

E. G. GUNN

MOTOR VEHICLE

Filed Aug. 12, 1921   3 Sheets-Sheet 1

1,521,682

INVENTOR.
Earl G. Gunn
BY
ATTORNEY.

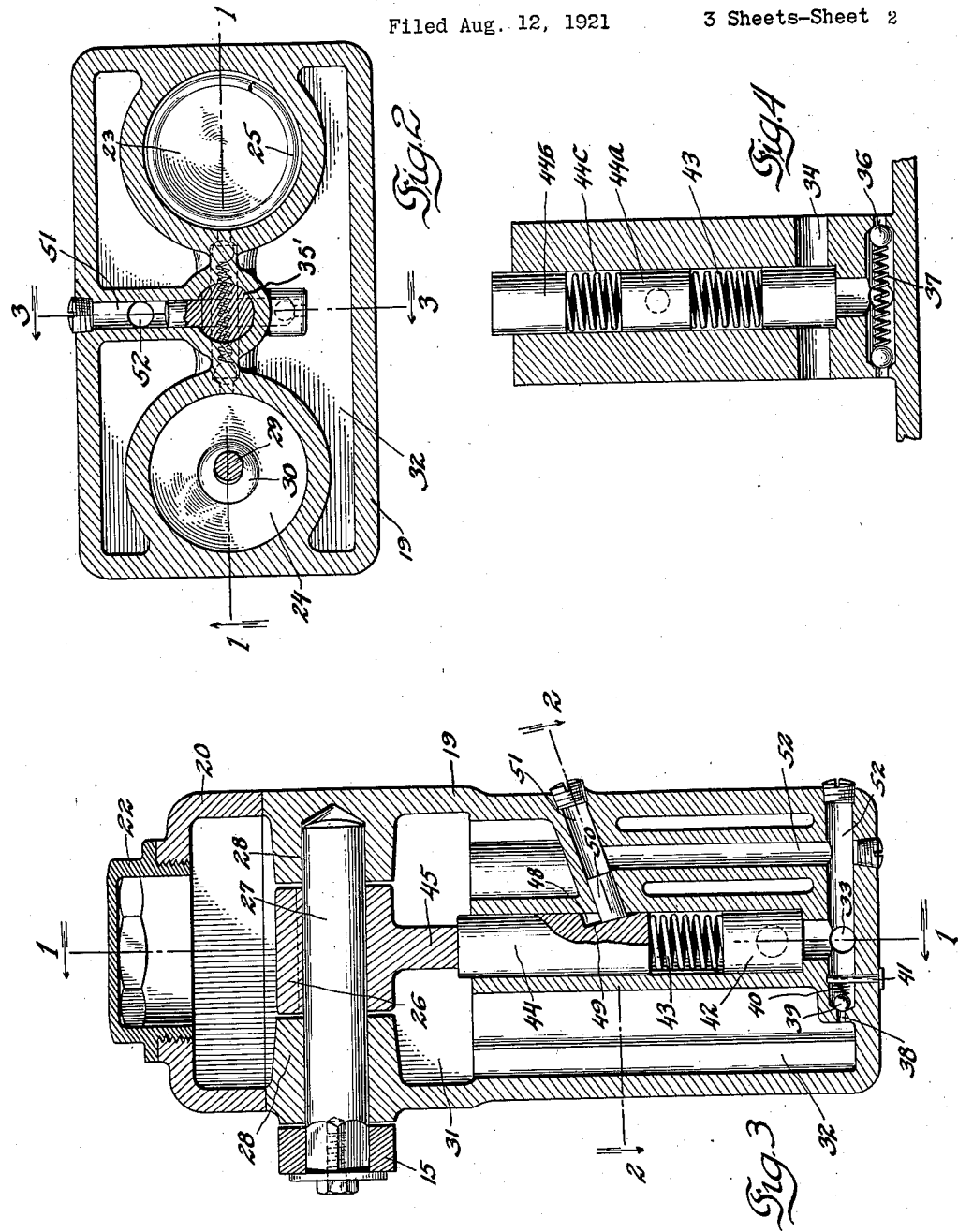

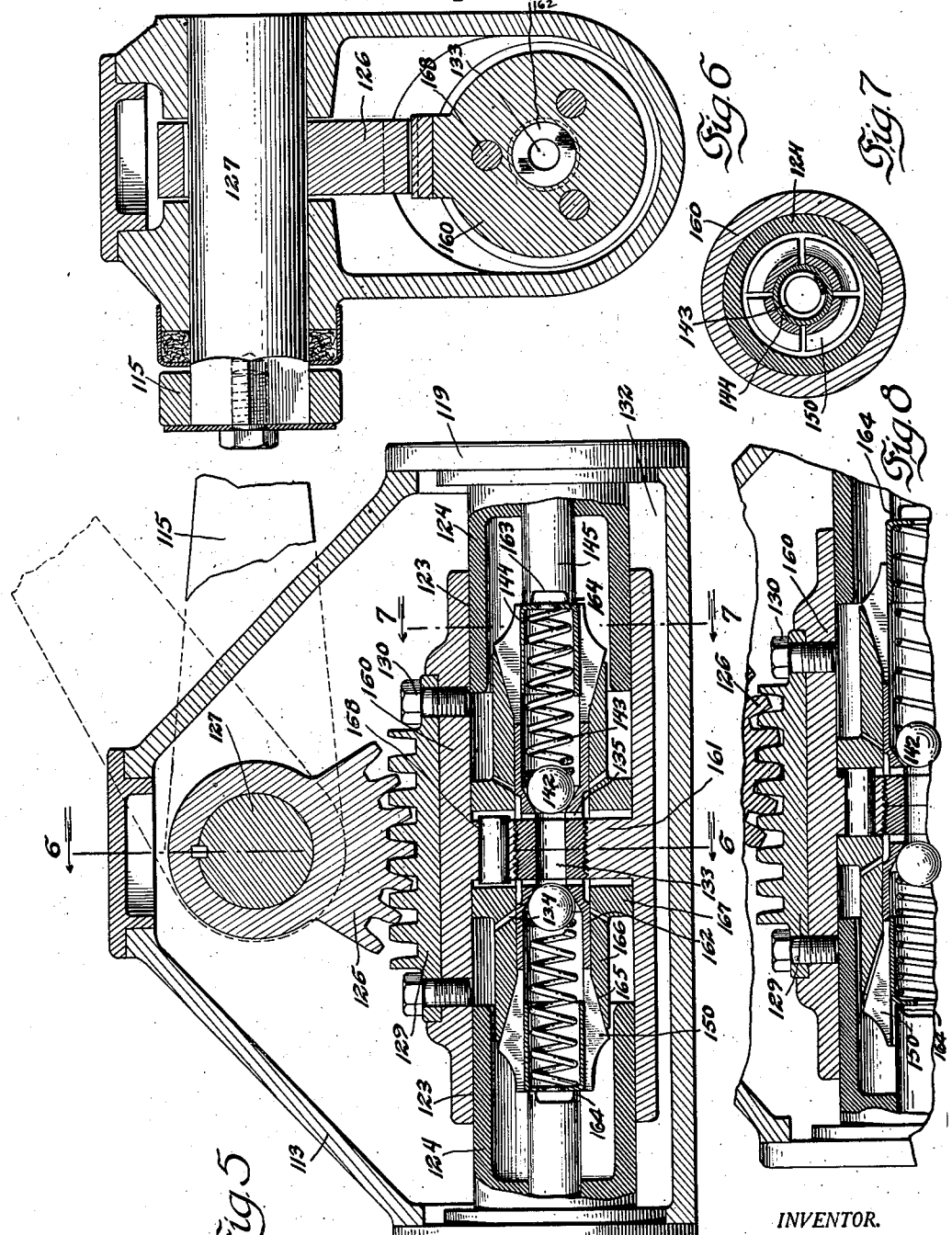

Patented Jan. 6, 1925.

1,521,682

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 12, 1921. Serial No. 491,690.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and particularly to retarding devices arranged between the axle and frame.

Retarding devices for motor vehicle spring actions have been used in various forms. In some cases these devices retard or dampen the spring action throughout the stroke in both directions; in others the spring action is retarded in one direction only, usually on the rebound; and in others the retarding action is in both directions from a neutral point.

The present invention contemplates providing its principal retarding effect from one extreme position to the other but with diminishing retarding effect as the lengths of the stroke decrease, and it is the salient object of the invention to provide mechanism for producing this effect.

Other objects of the invention will appear from the following description taken in connection with the drawings which form a part of this specification, and in which:

Figure 2 is a horizontal section substantially on the lines 2—2 of Figures 1 and 3;

Figure 3 is a vertical section on the lines 3—3 of Figures 1 and 2;

Figure 4 is a fragmentary view showing a slightly modified form of valve-setting device;

Figure 5 is a vertical section thru another form of retarding device;

Figure 6 is a section on the line 6—6 of Figure 5;

Figure 7 is a section on the line 7—7 of Figure 5; and

Figure 8 is a view similar to Figure 5 showing the upper half of the moving parts in another position.

Figure 1:
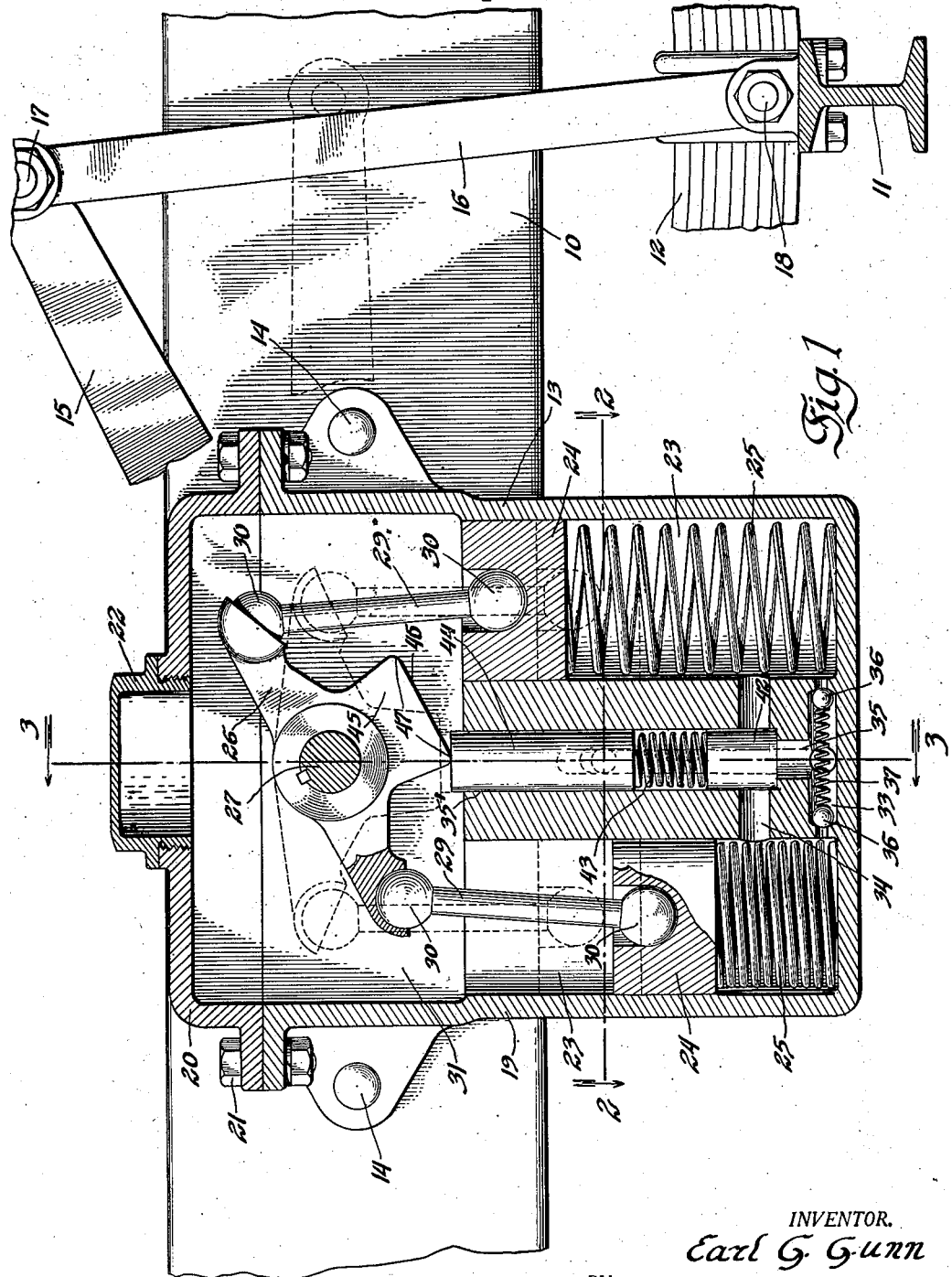
Figure 1 is a view showing axle and frame parts of a motor vehicle in elevation, with a retarding device applied thereto, the principal parts of the retarding device being in vertical section on the line 1—1 of Figures 2 and 3.

Referring to the drawings, 10 represents one of the side members of a motor vehicle frame, 11 is the vehicle axle, and 12 represents the usual spring connecting the frame and axle.

The retarding device of this invention is represented at 13. It is shown as bolted to the frame member 10 as at 14 and it is provided with an operating arm 15 which is connected by a link 16 to the axle 11, the link 16 being pivoted as at 17 and 18.

From the above it will be seen that the relative movements of the axle and frame will, thru the connecting rod 16, cause an oscillation of the arm 15. The arm is shown in full lines in its extreme upper position and in dotted lines in its neutral or middle position, in Figure 1.

The retarding device 13 above referred to is in the form of a metal casing or receptacle 19 having a cover 20 secured to it as by bolts 21, which cover is provided with a filling cap 22. It is intended that the casing shall be kept nearly filled with oil or other good lubricating compound so that the working parts may be well lubricated and the working pistons may be retarded in their operation.

In the casing 19 two cylinders 23 are formed and two pistons 24 operate in these cylinders. Springs 25 are compressed by the pistons on their downward stroke and serve to push the pistons upwardly on their return stroke. A two-armed lever or walking-beam 26 is mounted upon and keyed to a shaft 27, which is supported in bearings 28 in the upper part of the casing. One end of the shaft 27 projects thru the side of the casing and the arm 15 above referred to is detachably secured to it as shown particularly in Figure 3. Each of the arms of the walking-beam 26 is connected to one of the pistons 24 as by the connecting rods 29. These connecting rods are shown as having ball and socket connections 30 with the pistons and connecting rods but any other suitable pivoted connection may be used.

It will be understood that the relative movements of the axle and frame of the vehicle will, thru the parts 16 and 15, impart opposite reciprocal motions to the pistons 24 thru the rock-shaft 27 and walking-beam 26 and connecting rods 29.

The upper ends of the cylinders 23 open into that part of the casing 19 which is occupied by the walking-beam 26 so that any lubricant on top of the pistons 24 will be transferred back and forth above the pistons without interfering with their operation to any extent. This space above the cylinders is in the nature of a reservoir and in order to increase its capacity it extends downwardly around the cylinders as shown particularly in Figures 2 and 3. For convenience the upper part of this reservoir is indicated by the numeral 31 and the lower part of it by the numeral 32.

The cylinders 23 below the extreme positions of the pistons 24 are connected by two thru-passages 33 and 34. These passages are connected by a cross-passage 35 which passage extends upwardly in enlarged form to reservoir 31. This enlarged part of the passage 35 is indicated at 35' and it forms a guide for a valve means hereinafter described.

As shown particularly in Figure 3 a port 38 connects the lower part of the reservoir 32 with the passage 33 and a check-valve 39 retained by a spring 40 permits the reservoir 32 to supply liquid to the cylinders 23 when needed but prevents the out-flow of liquid from the cylinders. A pin 41 retains the spring 40 in position.

The passage 33 has two check-valves 36, a single spring 37 being shown to yieldingly retain them on their seats, so that the righthand valve 36 permits flow of liquid from righthand cylinder 23 into the passage 33 but stops a reverse flow, and the lefthand valve 36 permits flow of liquid from the lefthand cylinder 23 into the passage 33 but stops a reverse flow.

The passage 34 and the cross-passage 35 are controlled by a spring-loaded or similarly functioning valve 42. Its action is not affected by the pressure in the passage 34 because that pressure is on its side but it is affected by the pressure in the cross-passage 35 which pressure is of course the same as that in the passage 33.

The valve 42 is guided in the large passage 35' above referred to and a spring 43 controls the action of the valve and determines the pressure under which the valve will open. This spring in turn is controlled by a piston or rod 44, also sliding in the passage 35', which piston 44 extends into the compartment or casing 31 above described and preferably directly beneath the rock-shaft 27 or walking-beam 26. It will be seen that the piston 44 will act as an abutment for the spring 43 and its position will determine the strength of the spring 43 acting on the valve 42.

Secured to the rock-shaft 27 and shown as formed as a part of the two-armed lever 26, is a cam 45 having a low part 46 and opposite high parts or points 47. In Fig. 1 one of the high points 47 of the cam 45 is in contact with the upper end of the rod 44 and the rod therefore is in its lowest operative position. The spring 43 therefore is in its maximum compressed state and the valve 42 is set for its greatest degree of resistance to pressure in the cross-passage 35 beneath it. By moving the rockshaft 27, and consequently the cam 45 to its middle or neutral position, as shown in dotted lines, the part 46 of the cam 45 will then be in contact with the upper end of the rod 44 and said rod will be in its highest position. In that position the tension of the spring 43 will be lightest. By rocking the shaft 27 to its other extreme position the other cam part 47 will come into action and operate to depress the rod 44 in the same way that the first described cam part 47 depressed the rod 44.

From the above it will be seen that in the extreme relative positions of the vehicle frame and axle the rock-shaft 27 and its cam 45 will move the spring-setting device or rod 44 to its extreme position, and lesser strokes of the device will move the rod 44 to a corresponding lesser degree.

In Figure 3 the rod or piston 44 is shown as provided with a notch 48 which provides a flat surface 49 at a slight angle to the axis of the rod. A friction pin or catch 50 is arranged in a diagonal bore 51 at one side of the rod 44 so that the end of said pin 50 will act directly upon the surface 49. The pin 50 is free to slide in the bore 51 and at its rear it is acted upon by the pressure of the liquid in the passage 33, by reason of a connecting passage 52. The angle of the surface 49 with the bore 51 is such that the pressure behind the pin 50 will cause the latter to retain the rod 44 in the position to which it is moved by the cam 45. When the pressure behind the pin 50 is relieved the rod 44 will move upwardly under the tension of the spring 43.

The operation of the device is as follows: Starting with the device in its neutral or middle position, such as shown in dotted lines in Fig. 1, the rod or piston 44 is in its highest position and the spring 43 is therefore exerting its minimum tension against the valve 42. Slight oscillations of the arm 15 will change the position of the rod 44 very little and consequently the valve 42 will be easily raised from its seat to permit the transfer of liquid from one cylinder 23 to the other thru the passages 33, 35 and 34. Under these circumstances therefore there will be very little retarding effect produced. If a sudden bump is encountered however and the axle 11 is thereby moved to the extreme position in which it is shown in Fig. 1 the cam 45 will move the rod 44 downwardly until it reaches the position in which it is shown in Fig. 1. In this movement the retarding action of the device has been somewhat increased but not very materially so because the liquid is quickly transferred thru the open passages from one cylinder to the other. However, as the axle reverses its movement and begins its downward stroke the valve 42 snaps closed under the maximum tension of the spring 43 and as the upper piston 24 begins to descend the pressure in the passage 33 immediately rises because there is no escape for the liquid except by raising the valve 42 which is under the maximum pressure of the spring 43. This pressure in the passage 33 is transferred thru the passage 52 to the pin 50 which presses firmly against the rod 44 and retains the latter in its set position thruout that entire stroke of the axle. This means that the set pressure of the spring 43 and consequently the retarding effect of the device is maintained thruout that stroke and until reverse takes place. If the retarding effect has not been sufficient to stop the axle at or approximately at neutral position the opposite point 47 of the cam 45 will come into play and again set the rod 44 in its low or nearly low position so that the next stroke of the axle will also be retarded. This will continue as long as the strokes of the axle continue to pass neutral and it will be seen of course that the retarding effect of the device on one stroke is determined by the degree of movement of the device away from neutral on the previous stroke. In other words the degree of retardation thruout one stroke is adjusted or set by the degree of movement away from neutral on the previous stroke.

Referring to Fig. 4, the rod or piston 44 has here been made in two parts 44$^a$ and 44$^b$ with a spring 44$^c$ between the parts. In other respects the construction is the same as in Figures 1, 2 and 3.

The operation of the Fig. 4 construction is the same as that of the previous figures except that the part 44$^b$ will always follow the cam 45 and the spring 44$^c$ will cushion the part 44$^a$ thus preventing a sudden snapping back of the rod against the cam. It will be understood that the spring 44$^c$ is enough heavier than the spring 43 to cause the required setting of the latter in the operation of the device.

Referring to the construction shown in Figure 5, 6, 7 and 8, the retarding device is indicated generally at 113 and the operating arm at 115. The arm is keyed to a rock-shaft 127 which shaft reciprocates a cylindrical member 160 by means of a segment 126 and a rack 129. The rack is detachably secured to the member 160 as by bolts 130.

The cylindrical member 160 is formed with oppositely disposed open ended cylinders 123 between the head ends of which is an abutment 161.

The casing of the device is indicated at 119 and the oil reservoir is marked 132. The casing encloses the reciprocating member 160 and guides therefor are provided in the form of stationary hollow pistons 124. It will be understood that by the provision of a suitable passage in the abutment 161, the liquid in the cylinders 123 may be transferred from one cylinder to the other as the member 160 is reciprocated on the pistons 124.

In each of the cylinders 123 is a valve device 162, these devices being screwed into the abutment 161 as shown in Fig. 5. In these devices a thru-passage 133 with cross-passages 135 and relief valves 142 are provided to determine the degree of resistance to the flow of liquid from one cylinder to the other. These valves 142 are controlled by springs 143 which are adapted to be themselves controlled by pistons 144. Each of the pistons 144 is adapted to be set to a given position, depending upon the length of stroke, by a plunger 145, corresponding to the cam 45 of the device shown in Fig. 1. In order that oil may flow freely out of the valve devices 162 into their respective cylinders 123 the pistons 144 are formed with openings in their heads and the plungers 145 have lugs 164 which contact with the ends of the pistons 144.

The valve devices 162 above referred to are each provided with guiding and clamping parts or fingers 150, these fingers being formed by sawing or splitting a portion of the devices lengthwise as shown in Figures 5 and 7. The outer surface of these fingers is conical as at 165 and a corresponding conical sleeve 166 surrounds them. This sleeve slides on the outside of the device 162 and its inner end is in the form of a piston 167 slidingly arranged in the cylinder 123. Several ports 134 are provided in each sleeve 166 as shown in Figure 5.

Between the inner ends of the sleeves 166 and slidably mounted in the abutment 161 is a pin or several pins 168, permitting one of the sleeves 166 to push the other one into clamping position as will be hereinafter explained.

The operative effect of the device shown in Figures 5, 6, 7 and 8 is the same as that of the device shown in the other figures. With the parts starting in neutral position such as they are shown in Figure 5 there is very slight resistance to the movement of the reciprocating member 160 because the tension of the springs 143 is very light and the liquid may therefore pass alternately from one cylinder to the other thru the ports 134 and passages 135 and 133, the valves 142 offering very little resistance. In this operation it will be noted that the valve devices 162 move with the reciprocating member 160 and the sleeves 166 are alternately moved by pressure so that the ports 134 are alternately uncovered.

When the device is operated to one of its extreme positions, as shown in Figure 8, one of the plungers 145 pushes the corresponding piston 144 inwardly to a degree depending upon the length of the stroke from neutral and as the device is reversed the sleeve 166 is immediately moved to clamp the fingers 150 around the piston 144 and hold the latter in its set position until the next reverse takes place. Of course, the position of the piston 144 determines the tension of the spring 143 and consequently the degree of resistance to opening of the valve 142.

Other forms than those here illustrated may be made without departing from the spirit or scope of the invention.

Having described my invention, what I claim and desire to secure by Letters Patent is:

1. A retarding device having an adjustable retarding means, and means for setting the adjustment at the end of each stroke.

2. A retarding device having means for adjusting the degree of retardation, and means for setting the adjustment upon reversal of action.

3. A retarding device having a spring-controlled valve for determining the degree of retarding action, and means for adjusting the tension of the spring of said valve in accordance with the length of stroke of the device.

4. A retarding device having a spring controlled valve for determining the degree of retarding action, and means for adjusting the tension of the spring of said valve in accordance with the degree of action away from neutral on a given stroke.

5. A retarding device comprising cylinders and pistons therein, a valve controlled transfer passage between the cylinders, and means for adjusting the valve action in accordance with the degree of movement of the pistons.

6. A retarding device comprising a casing having cylinders therein, pistons in the cylinders, a two-armed lever operative in the casing, connecting rods from the arms of said lever to said pistons, and a valve-controlled conduit between the pistons.

7. A retarding device comprising a casing having cylinders therein, pistons in the cylinders, a two-armed lever operative in the casing, connecting rods from the arms of said lever to said pistons, a valve-controlled passage connecting the cylinder, and means operated by said lever for adjusting the action of the valve.

8. A retarding device comprising a cylinder and piston, a rock-shaft and connections to the piston, a valve for controlling the flow of liquid from the cylinder, a cam for adjusting the action of the valve, and a two-piece rod operated by the cam.

9. A retarding device comprising a cylinder and piston, a rock-shaft and connections to the piston, a valve for controlling the flow of liquid from the cylinder, a cam for adjusting the action of the valve, and a piston and a spring connected follower between the cam and valve.

10. A retarding device comprising a casing with two cylinders therein, pistons in said cylinders, a rock-shaft mounted in the casing, a walking-beam keyed to the rock-shaft, connecting rods from the walking-beam to the pistons, and a valve-controlled passage between the cylinders.

11. A retarding device comprising a casing with two cylinders therein, pistons in said cylinders, a rock-shaft mounted in the casing, a walking-beam keyed to the rock-shaft, connecting rods from the walking-beam to the pistons, a valve-controlled passage between the cylinders, and a cam device on the rock-shaft connected to adjust the action of the valve of said connecting passage.

12. In combination with a motor vehicle having a frame and axle, a retarding device connected therebetween including piston means operable from a neutral position, means for resisting the return movement of the pistons, and means for determining the degree of resistance of the stroke of the device by the degree of movement of the piston means away from neutral on the previous stroke of the device.

13. The combination with a motor vehicle having a frame and axle, of a retarding device therebetween including pressure operated means adapted to permit relative movement of the parts in either direction from a neutral position and to resist return movements, and means controlling said pressure means to proportion the resistance to the length of the initial movement away from neutral.

14. A retarding device adapted to resist the relative movements of parts in one direction, including pressure means connected to the parts, and control means actuated by movements of the parts on one stroke of the device to determine the degree of resistance of the pressure means on the following stroke.

15. A retarding device including connected members under pressure adapted to move in either direction from a neutral position, means to vary the pressure on said members, and means controlling said pressure in accordance with the degree of movement of the members from the neutral position.

In testimony whereof I affix my signature.

EARL G. GUNN.